A. L. McGREGOR.
AUTOMOBILE BUMPER.
APPLICATION FILED JAN. 17, 1921.
1,372,153.
Patented Mar. 22, 1921.
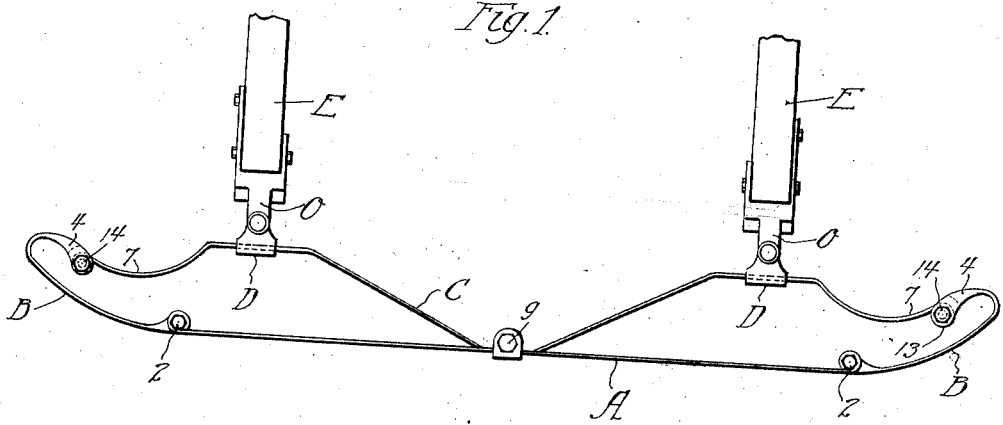
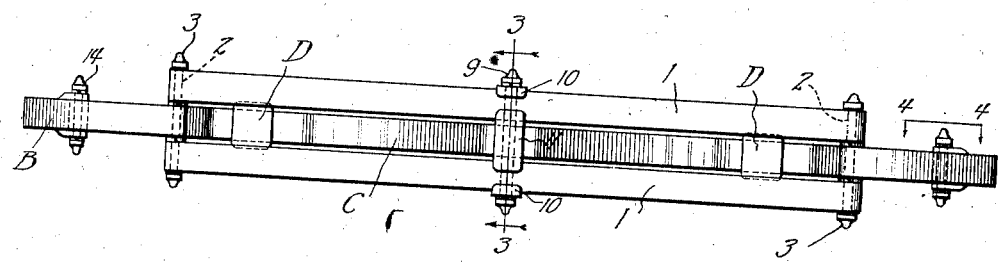
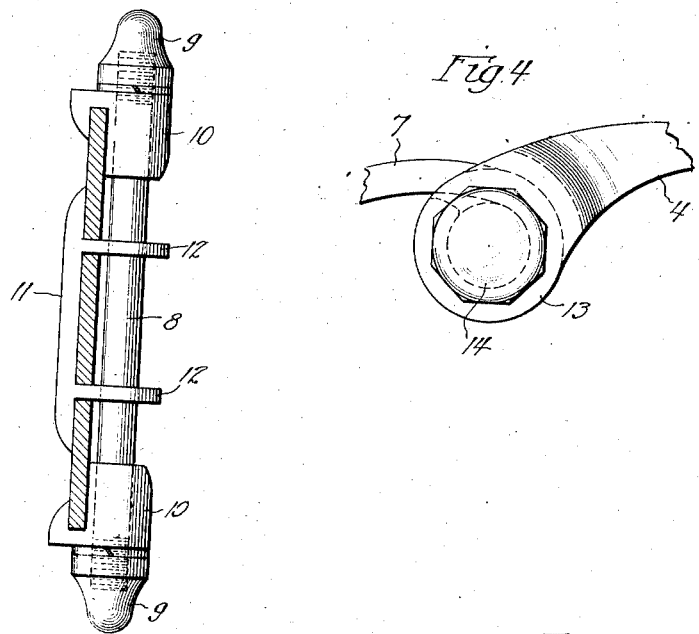
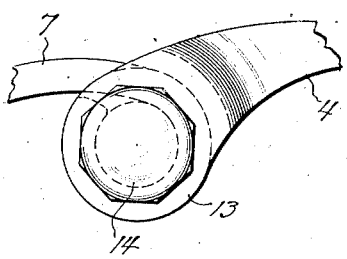
Inventor
Allan L. McGregor
By
Offield, Towle & Linthicum
Attys.

UNITED STATES PATENT OFFICE.

ALLAN L. McGREGOR, OF CHICAGO, ILLINOIS.

AUTOMOBILE-BUMPER.

1,372,153.

Specification of Letters Patent.  Patented Mar. 22, 1921.

Application filed January 17, 1921. Serial No. 437,733.

*To all whom it may concern:*

Be it known that I, ALLAN L. McGREGOR, a citizen of the United States, and a resident of Chicago, in the county of Cook and State of Illinois, have invented certain new and useful Improvements in Automobile-Bumpers, of which the following is a specification.

This invention relates to improvements in automobile bumpers, and more particularly to bumpers of the resilient bar type, characterized by a wide impact section extending throughout the central portion of the bumper.

In common with all bumpers of this type, the object of the invention is to provide a structure which will afford ample protection to a motor vehicle in the event of collision, by yieldably resisting the shocks delivered against it, without permanent distortion of the bumper, these results being secured, for the most part, by designing and assembling the parts so as to promote equal distribution of the shock throughout the entire bumper structure, and by the provision of suitable reinforcing or brace members.

A bumper embodying the invention is illustrated in the accompanying drawings, in which—

Figure 1 is a top plan view of the bumper as attached to the frame of a motor vehicle, Fig. 2 is a view in front elevation of the bumper, Fig. 3 is an enlarged detailed view in vertical section, taken on line 3—3 of Fig. 2, and Fig. 4 is an enlarged detailed view in top plan of one end of the bumper.

In its general structure, the bumper comprises a front impact member consisting of a central impact section A, made up of two parallel bars spaced apart vertically, and sections B—B extending laterally beyond the ends of the central impact section A and forming the outer extremities of the bumper, and a reinforcing member C spaced rearwardly of the impact section A and adapted for direct connection with the frame members D—D of the vehicle through the medium of suitable brackets E—E.

Referring now more in detail to the different parts of the bumper as already described, the central impact section is made up of two parallel bars 1—1 which are spaced apart one above the other and joined together at their ends by means of vertical pins 2—2 which engage eyes formed at the ends of said bars, these pins being provided at their ends with screw caps or nuts 3 which are removable for the purpose of assembling or disassembling the structure. Connected with the pins 2—2 and intermediate the ends of the bars 1—1 are single bars 4—4 of comparatively short length which extend outwardly beyond the central impact section, and curving rearwardly to form the end portions being bent rearwardly and inwardly in V-shape and terminating a short distance inwardly. The inner ends of the bars 4 are bent in the form of eyes which surround the pins 3—3 between the ends of the bars 1—1, thereby forming relatively flexible connection between the central impact section A and end sections B.

As before suggested, the reinforcing member C extends the full width of the bumper, being spaced for the most part rearwardly of the central impact section A, and comprising a resilient bar pivotally connected with the ends of the U-shaped end bars 4—4 in a manner hereinafter to be described in detail, and moreover is bent or shaped in the following manner: Immediately adjacent its outer extremities, the bar is curved in a forward direction throughout the portions 5—5, and inwardly therefrom are formed short straight portions as at 6—6, to which the brackets E—E are connected. The central portion 7 of the bar C between the bracket engaging portions 6—6, is bent V-shaped and toward the central impact section B, the apex of this V-shaped portion 7 terminating at the center of the central impact section A, and in the vertical plane thereof. At this point a connecting member clearly shown in Fig. 3, is mounted, the same acting to tie the apex of the V-shaped portion 7 to the bars 1—1 of the central impact section A. This connecting member comprises a pin 8 similar in all respects to the pins 3—3, and extends vertically immediately to the rear of the bars 1—1. As before, the ends of the pin 8 are surmounted by means of removable screw caps 9—9, and carried upon the pin are blocks 10—10 which occupy positions adjacent the ends of the pin and are provided with recessed lugs 10$^a$ in the nature of hooks which engage the outer edges of the bars 1—1. Likewise, there is mounted on the pin 8 and intermediate the blocks 10—10 the vertical locking plate 11 provided with integral ears 12—12, which extend between the edges of the bar 7 and those of the bars 1—1, said ears being provided with apertures through which the pin 8 extends, as clearly shown in Fig. 3. The ends of the plate 12 overlap the bars 1—1, thus performing the function of anchoring the bars 1—1 as well as securely tying the central portion of the bar C to the impact section A.

Referring now more in detail to the manner in which the outer ends of the bars 4—4 are pivotally connected with the corresponding ends of the rear bar C, the extremities of the bars 4—4 are bent in U-shape, the free ends terminating a short distance inwardly from the ends of the bumper in the form of enlarged bifurcated heads 13—13. A bolt 14 extends through the enlarged ends of each bar, and surrounding the bolt is an eye formed at the corresponding end of the bar 7, as shown in Fig. 4, thus forming a hinge like connection at these points.

Thus it is seen that the central impact section is pivotally, and hence yieldably supported between the U-shaped end bars 4—4, which in turn are pivotally supported at the ends of the rear bar C, the latter terminating a short distance outwardly from the attaching brackets. The several points of pivotal connection are thus located inwardly from the extremities of the bumper, and not at the extreme ends. This structural feature not only enhances the general appearance of the bumper, but eliminates what might be a disadvantage; namely, the presence of bolts and other connecting members at the exposed extremities of the bumper. Inasmuch as the ends of a bumper are continually exposed to contact with loose and movable objects, the desirability of the smoothly rounded ends, as provided by the U-shaped end bars, is manifest.

Having described the bumper embodying the preferred construction, I claim as my invention:

1. In a bumper, the combination of a central impact section, end sections comprising bars connected to the ends of said impact section, and bent in U-shape to form the ends of the bumper, and a rear bar adapted for attachment to a vehicle frame and connected at its ends with the ends of said end sections inwardly from the extremities of the bumper.

2. In a bumper, the combination of a central impact section, end sections comprising bars pivotally connected to the ends of said impact section and bent in U-shape to form the ends of the bumper, and a rearwardly disposed bar adapted for attachment to a vehicle frame and having pivotal connection with the outer ends of the bars of said end sections inwardly from the U-shaped extremities of the bumper.

3. In a bumper, the combination of a pair of parallel and vertically spaced bars forming a central impact section, pins connecting the ends of said bars, single end bars bent to form the end sections of the bumper and pivotally connected to said pins and a bar spaced rearwardly of said impact section, and pivotally connected to the ends of said single bars inwardly from the extremities of the bumper.

4. In a bumper, the combination of a central impact section comprising vertically spaced bars, pins connecting the ends of said bars, single bars pivotally connected with said pins and bent in U-shape to form the end sections of the bumper, and a rearwardly disposed bar pivotally connected to the free ends of said single bars, at points spaced inwardly from the extremities of the bumper, a portion of said bar intermediate its ends being bent in U-form toward the central portion of said impact section, and fixed at its apex between the bars thereof.

In witness whereof, I hereunto subscribe my name this 11th day of January, A. D. 1924.

ALLAN L. McCREGOR.